US008956431B2

(12) United States Patent
Ackermann et al.

(10) Patent No.: US 8,956,431 B2
(45) Date of Patent: Feb. 17, 2015

(54) TWO-PART CYCLONE SEPARATOR

(71) Applicant: Mann+Hummel GmbH, Ludwigsburg (DE)

(72) Inventors: Steffen Ackermann, Otterstadt (DE); Volker Greif, Harthausen (DE)

(73) Assignee: Mann+Hummel GmbH, Ludwigsburg (DE)

( * ) Notice: Subject to any disclaimer, the term of this patent is extended or adjusted under 35 U.S.C. 154(b) by 0 days.

(21) Appl. No.: 13/748,378

(22) Filed: Jan. 23, 2013

(65) Prior Publication Data

US 2013/0133300 A1 May 30, 2013

Related U.S. Application Data

(63) Continuation of application No. PCT/EP2011/062411, filed on Jul. 20, 2011.

(30) Foreign Application Priority Data

Jul. 23, 2010 (DE) .......................... 10 2010 032 169

(51) Int. Cl.
| | | |
|---|---|---|
| B01D 45/12 | (2006.01) | |
| B01D 45/16 | (2006.01) | |
| B04C 3/04 | (2006.01) | |
| B04C 3/06 | (2006.01) | |
| B04C 3/00 | (2006.01) | |

(52) U.S. Cl.
CPC . *B01D 45/16* (2013.01); *B04C 3/04* (2013.01); *B04C 3/06* (2013.01); *B04C 2003/003* (2013.01)
USPC ................... 55/345; 55/447; 55/456; 55/457; 55/462; 55/348; 55/396; 55/347

(58) Field of Classification Search
USPC ............................ 55/345, 348, 396, 457, 347
See application file for complete search history.

(56) References Cited

U.S. PATENT DOCUMENTS

| | | | |
|---|---|---|---|
| 3,713,280 A | 1/1973 | Keller et al. | |
| 5,480,464 A | 1/1996 | De Villiers et al. | |
| 6,884,273 B2 | 4/2005 | Kopec et al. | |
| 2008/0016832 A1* | 1/2008 | Krisko et al. | .................. 55/342 |
| 2008/0209869 A1 | 9/2008 | Rother et al. | |
| 2010/0267540 A1* | 10/2010 | Babb et al. | ...................... 494/59 |

FOREIGN PATENT DOCUMENTS

| | | |
|---|---|---|
| CA | 1180665 A1 | 1/1985 |
| DE | 69304222 T2 | 4/1997 |
| DE | 102005031059 A1 | 1/2007 |
| EP | 1287896 A1 | 3/2003 |
| FR | 1392667 A | 3/1965 |
| GB | 2324484 A | 10/1998 |
| WO | 2005094655 A2 | 10/2005 |

\* cited by examiner

OTHER PUBLICATIONS

PCT search report of PCT/EP2011/062411, 2011.

*Primary Examiner* — Dung H Bui
(74) *Attorney, Agent, or Firm* — James Hasselbeck

(57) ABSTRACT

A cyclone separator (1) for separating particles from a gas flow, includes: a first housing component (3) with a guiding apparatus (7) for providing the inflowing gas flow with an angular momentum, a second housing component (4) with an immersion tube (10) through which the cleaned gas flow can be discharged, and a cyclone tube (9) which surrounds the immersion tube (10) and on which at least one opening (11) is formed for discharging the particles that are separated from the gas flow. The cyclone tube (9) is formed on the second housing component (4).

12 Claims, 2 Drawing Sheets

TWO-PART CYCLONE SEPARATOR

CROSS REFERENCE TO RELATED APPLICATIONS

This application is US Bypass Continuation of international patent application no. PCT/EP2011/062411 filed: Jul. 20, 2011 designating the United States of America, the entire disclosure of which is incorporated herein by reference. Priority is claimed based on German patent application no. 10 2010 032 169.9 filed: Jul. 23, 2010.

TECHNICAL FIELD

The present invention concerns a cyclone separator for separating particles from a gas flow, in particular an air flow, comprising a first housing component with a guiding apparatus for imparting to the incoming gas flow an angular momentum, a second housing component comprising an immersion tube through which the cleaned gas flow can be discharged, as well as a cyclone tube surrounding the immersion tube and formed with at least one opening for discharging the particles that have been separated from the gas flow.

PRIOR ART

DE 10 2005 031 059 A1 discloses a cyclone separator in the form of a multi-cell cyclone or cyclone block arranged as a pre-filter in front of an air filter and provided with a plurality of separating cyclones that are axially positioned adjacent to each other and receive flow axially. The cyclone separator has an angular momentum generator that imparts to the incoming air to be filtered an angular momentum. The cyclone tubes of the cyclone cells are attached to an insert that has angular momentum generating partial elements of the angular momentum generator; the immersion tubes of the cyclone cells are formed on an additional component with a bottom plate that connects the immersion tubes and forms the bottom of a dirt particle collecting chamber.

U.S. 2008/0016832 A1 discloses a cyclone separator with a plurality of cyclone tubes that are inserted into a perforated plate with an end provided with an angular momentum generator. At the opposite end, the cyclone tubes have ports or openings through which the separated dirt particles are supplied to a dirt particle collecting chamber. The cyclone tubes are placed onto a plate that forms the bottom of a cup-shaped housing on which immersion tubes are provided that are each surrounded by a cyclone tube, respectively. The cyclone tubes are connected to the perforated plate in such a manner that the ports or openings are facing a discharge opening or a discharge tube that is laterally disposed on the housing cup.

In the above described cyclone separator, a plurality of cyclone tubes is used that are formed as separate components and that, for assembly, must be suitably positioned and aligned. Accordingly, the known cyclone separator has a complex construction leading to high production costs.

The invention has the object to provide an inexpensive cyclone separator with a high efficiency.

SUMMARY OF THE INVENTION

This object is solved in that the cyclone tube is formed on the second housing component. By providing the cyclone tube and the immersion tube on a common housing component, no leaks, caused by manufacturing tolerances, are produced between the cyclone tube and the bottom plate on which the immersion tube is formed upon assembly of the housing components of the cyclone separator. In contrast to this, in U.S. 2008/0016832 A1 in which also ports or openings for supplying separated dirt particles to a collecting chamber are used, a respective cyclone tube is placed onto a bottom plate of the second housing component; this may cause the afore described leaks that may result in escape of particles even adjacent to the opening provided for this purpose. Accordingly, in the cyclone separator according to the invention no particles that have been separated by a first cyclone cell can pass accidentally into a second cyclone cell so that the efficiency of separation in the cyclone separator according to the invention is not reduced by manufacturing tolerances. By arranging the cyclone tube and the immersion tube on the second housing component, the required joining or connecting location between the housing components can be displaced toward the guiding apparatus so that the area in which the actual separating process takes place is clearly defined.

At the transition between cyclone tube and immersion tube, the cyclone tube has, according to the invention, at least one, preferably precisely one, opening through which the separated particles from a cyclone cell can exit in a defined direction. When several cyclone cells are arranged adjacent to each other in a cyclone block, the respective openings can be oriented preferably toward one exit opening.

In an especially preferred embodiment, the second housing component is embodied as a monolithic component which preferably forms a housing cup. When the second housing component is produced as a monolithic part, the cyclone tube, the immersion tube as well as the bottom plate are integrated therein and no seals between these components are required anymore.

A further embodiment is characterized in that the second housing component is embodied as a plastic component that is produced in particular by an injection molding process. The production of the second component by injection molding is inexpensive and is suitable for high production quantities. Demolding of the openings (ports) on the respective cyclone cell or cells by an injection molding process can be realized by suitable mold slides. In this context, the first housing component can be produced also of plastic material by an injection molding process.

In a further embodiment, the second housing component has a plurality of immersion tubes and a corresponding plurality of cyclone tubes into which the gas flow to be cleaned flows in through a guiding apparatus, respectively, that is provided on the first housing component. Bundling of several cyclone cells to a so-called cyclone block makes it possible to process a greater gas flow to be filtered and to make available a greater quantity of filtered gas per unit of time. A cyclone block has furthermore the advantage that a common collecting chamber can be provided in which the particles separated by the individual cyclone cells are collected; this lowers the material and production costs. For example, several cyclone and immersion tubes can be arranged in an annular shape about a center of the collecting chamber. It is understood that also another geometric arrangement of the cyclone and immersion tubes in the collecting chamber is possible.

In a further development, the openings of the cyclone tubes are facing a discharge opening for discharging particles. In this case, the gas flows that are exiting through the openings are substantially facing in a common direction so that in a simple way it can be prevented that particles exiting from one cyclone cell can enter through an opening into another cyclone cell. It is understood that a suitable orientation of the openings depends on the arrangement of the cyclone cells in the collecting chamber and the flow conditions in the collecting chamber which in particular are affected by the arrangement of the discharge opening, i.e., not all openings must mandatorily be oriented toward the discharge opening; instead, the openings can also be pointing in different directions.

An embodiment is preferred in which the first housing component and the second housing component are connected to each by a releasable connection, in particular a plug-in connection. A plug-in connection can be produced and released again easily. For example, in this context the guiding apparatus on the first housing component can be connected with the cyclone tube on the second housing component by means of a plug-in connection. Preferably, for this purpose, the guiding apparatus has a joining projection that surrounds the cyclone tube in the assembled state and seals it relative to the collecting chamber. It is understood that also other releasable connections, for example, by screwing, snap-on action, clamping action etc., can be used for connecting the two housing components.

An especially preferred embodiment is characterized in that the immersion tube projects on the side that is facing away from the first housing component into the cyclone tube. The gas to be cleaned enters through the guiding apparatus into the cyclone separator and exits in cleaned form at the opposite side through the immersion tube.

In a further embodiment, the opening for discharging particles is formed on an end of the cyclone tube that is facing away from the first housing component. The gas flow that is caused to swirl flows along the inner wall of the cyclone tube in the direction of the immersion tube. Separated particles collect between the immersion tube and cyclone tube and exit through the opening from the cyclone tube.

Especially preferred is an embodiment in which the guiding apparatus has a plurality of guiding vanes. Several guiding vanes impart to the incoming gas a uniform angular momentum. The guiding vanes can be designed to be stationary, i.e., the swirl of the gas is caused by the deflection of gas flow at the guiding vanes that are arranged at a slant to the gas flow.

One embodiment is characterized in that the second housing component is embodied as a housing cup and the first housing component as a housing cover. Housing cup and cover are connected to each other, for example, by a plug-in connection. Since the plug-in connection can be released in a simple way, the interior of the cyclone separator is accessible in a simple way through the housing cover for servicing purposes. It is understood that the housing cup and the housing cover can also be connected to each other in a different way, for example, by a snap-on connection or by connecting means such as clips etc.

In an especially preferred embodiment, on the first and/or on the second housing component a discharge opening for discharging particles from the cyclone separator is provided. A vacuum can be optionally applied at the discharge opening by means of which the particles are sucked from the collecting chamber provided in the cyclone separator. Alternatively, the particles, without applying a vacuum, are conveyed through the discharge opening solely by means of the flow that forces them out of the opening in the cyclone tube.

Further features and advantages of the invention result from the following description of embodiments of the invention, from the Figures of the drawing showing details important to the invention, and from the claims. The individual features can be realized individually, or several thereof in any combination, in a variant of the invention.

BRIEF DESCRIPTION OF THE DRAWINGS

Embodiments are illustrated in the schematic drawing and will be explained in the following description. It is shown in.

EMBODIMENT(S) OF THE INVENTION

Figure 1:
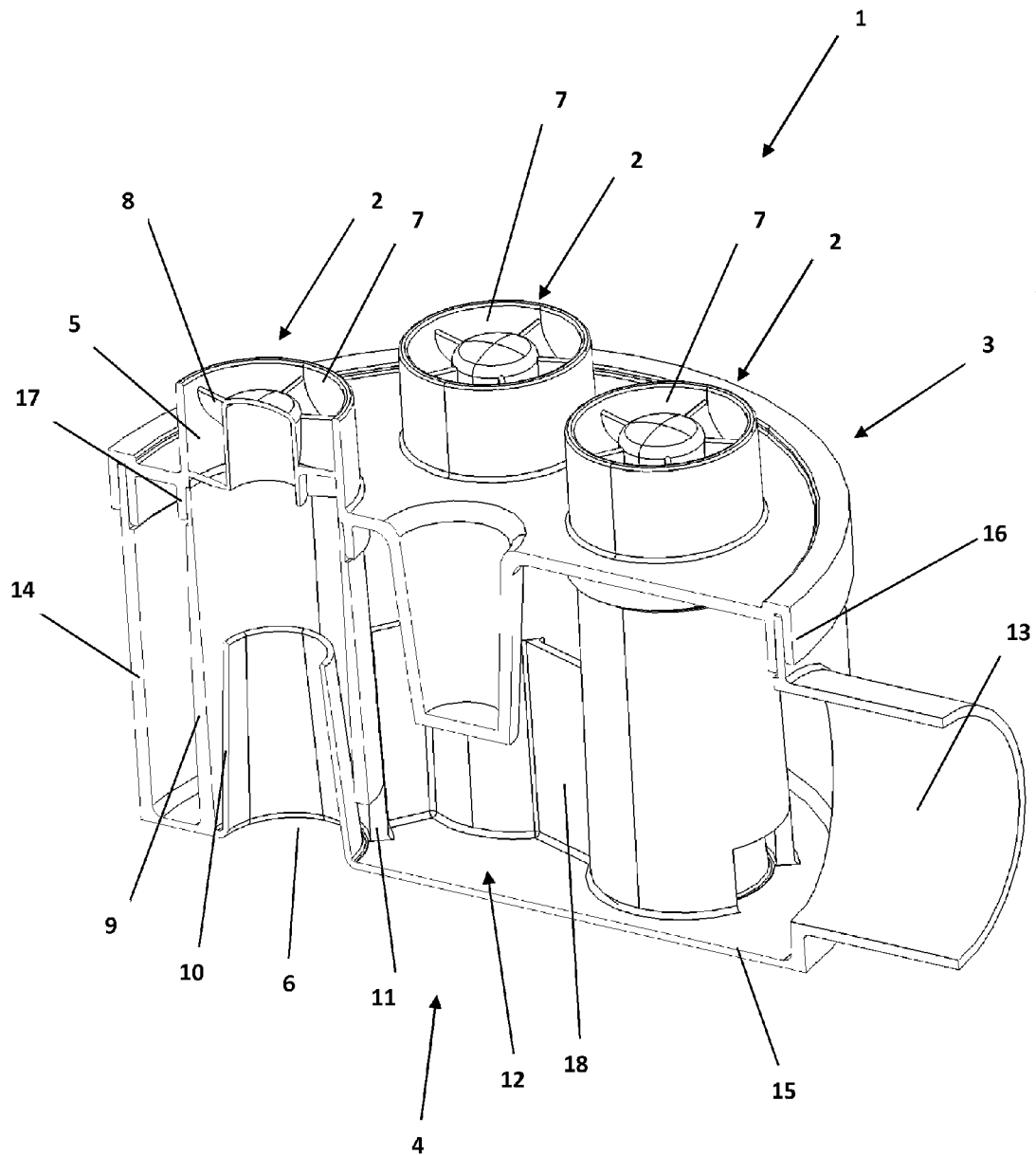
FIG. 1 a three-dimensional central section illustration of a cyclone separator with several cyclone cells; as well as FIG. 2 a three-dimensional eccentric section illustration of the cyclone separator of FIG. 1.

FIG. 1 shows a cyclone separator 1 in the form of a cyclone block with a plurality of cyclone cells 2. The cyclone separator 1 is comprised of a first housing component that is embodied as a housing cover 3 and a second housing component that is embodied as a housing cup 4.

Each cyclone cell 2 comprises an inlet opening 5 for a gas flow from which particles are to be separated and an outlet 6 for the cleaned gas flow. At the inlet opening 5 a respective guiding apparatus 7 is formed as a part of the housing cover 3 and is provided with several guiding vanes 8. The guiding vanes 8 are stationary and curved so that the gas flow to be cleaned that flows against the guiding vanes 8 of the guiding apparatus 7 is imparted with a swirl.

Each cyclone cell 2 has a cylindrically embodied cyclone tube 9 and an immersion tube 10 that are parts of the housing cup 4. The immersion tube 10 projects from the side of the cyclone tube 9 facing away from the guiding apparatus 7 into the cyclone tube 9 and tapers in the direction toward the guiding apparatus 7. The housing cup 4 with the cyclone tube 9 and the immersion tube 10 is monolithic and the two tubes 9, 10 are directly connected to each other at the side of the cyclone tube 9 that is facing away from the guiding apparatus 7. The immersion tube 10 forms the outlet 6 through which the gas flow that has been cleaned exits from the respective cyclone cell 2.

On the side of the cyclone tube 9 that is facing away from the guiding apparatus 7 an opening 11 is provided through which particles separated from the gas flow exit, together with a portion of the gas flow, from the cyclone tube 9 and flow into a collecting chamber 12 that is formed in the housing cup 4 between the cyclone cells 2. The collecting chamber 12 has an outlet opening 13 through which the separated particles are removed from the collecting chamber 12, optionally by means of a pump or solely with the aid of the flow by means of which they have been carried out of the cyclone cells 2. The collecting chamber 12 is delimited by the outer wall 14 and the bottom 15 of the housing cup 4 and the housing cover 3.

The housing cover 3 with the guiding apparatus 7 is pushed onto the housing cup 4. For this purpose, on the housing cover 3 U-shaped receptacles 16 are formed that are pushed onto the outer wall 14 of the housing cup 4. This plug-in connection seals the collecting chamber 12 relative to the exterior.

When pushing on the housing cover 3 onto the housing cup 4, the guiding apparatus 7 is also pushed onto the respective cyclone tube 9. For this purpose, joining projections 17 are provided on the side of guiding apparatus 7 facing the immersion tube 10 and surround the cyclone tube 9 and seal it relative to the collecting chamber 12.

Figure 2:
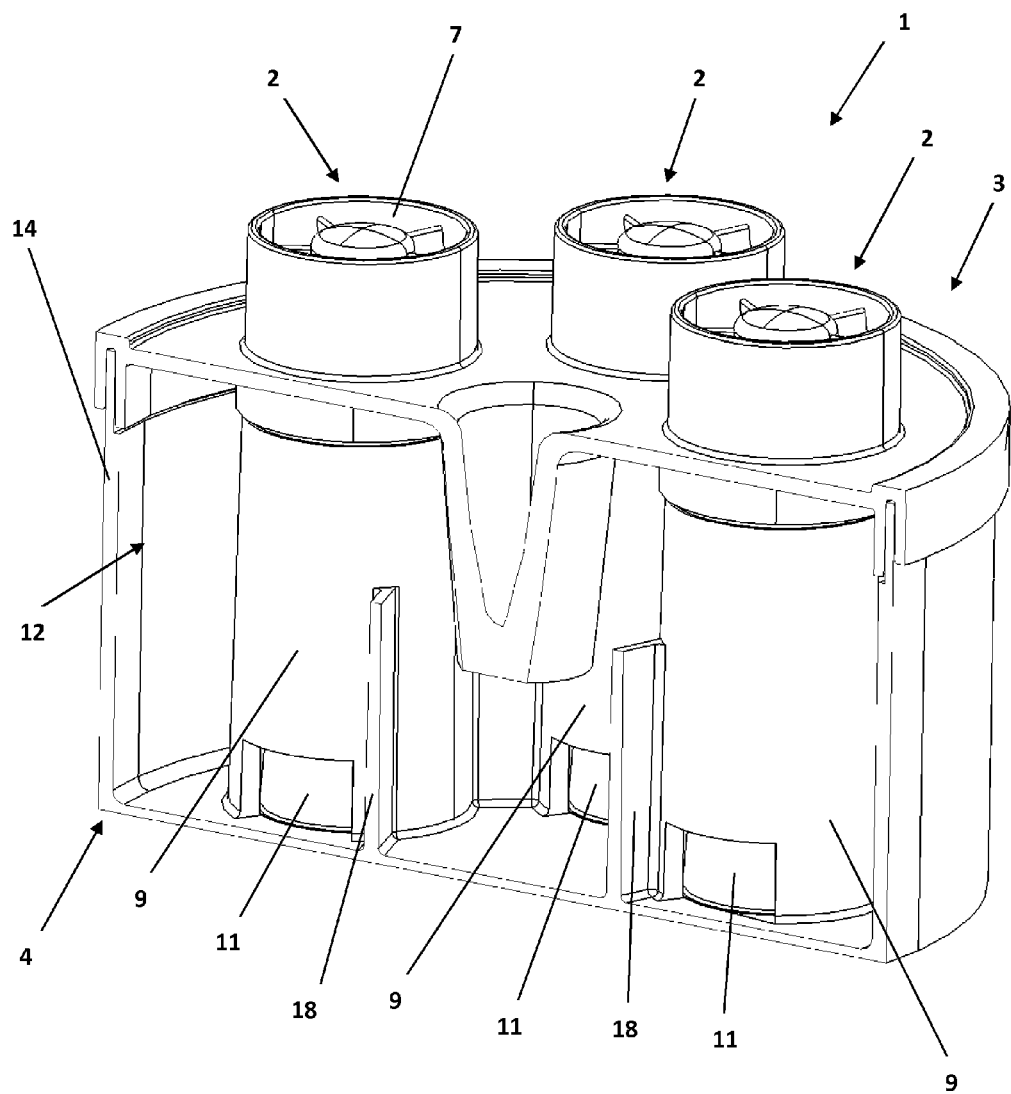

According to FIG. 2 all openings 11 of the cyclone tube 9 are oriented toward a discharge opening 13 or are facing it (FIG. 1). This is beneficial because the particles flowing out of the openings 11 flow toward the discharge opening 13 but the openings 11 are arranged on the side that is facing away from the gas flow that is being discharged. With this arrangement of the openings 11, it can be prevented almost completely that particles exiting from a first cyclone cell 2 can pass from the collecting chamber 12 through an opening 11 of another cyclone cell 2 into the latter and reduce the efficiency of separation. As also shown in FIG. 2, the individual cyclone cells 2 are connected to each other by reinforcement ribs 18.

It is understood that in contrast to the illustration of FIGS. 1 and 2 the cyclone separator 1 can also be comprised of only a single cyclone cell 2, i.e., comprises a housing cover 3 with only one guiding apparatus 7 and a housing cup 4 with only one cyclone tube 9 and only one immersion tube 10. The outer wall 14 of the housing cup 4 in this case can form the cyclone tube in which an opening for discharging particles in a defined direction is provided.

The invention claimed is:

1. Cyclone separator (1) for separating particles from a gas flow, comprising:
   a cyclone separator housing;
   a first housing component (3) of the cyclone separator housing including a guiding apparatus (7) of guiding vanes (8), the guiding apparatus (7) having an inlet opening (5) through which an incoming gas flow enters the cyclone separator, the plurality of guiding vanes (8) formed at and within the inlet opening, the guiding vanes imparting to the incoming gas flow an angular momentum;
   wherein the guiding vanes (8) are formed together with and formed by the first housing component (3) as a single one-piece monolithic first housing component (3);
   a second housing component (4) of the cyclone separator housing including an immersion tube (10) through which a cleaned gas flow can be discharged; and
   a cyclone tube (9) surrounding the immersion tube (10) and having formed thereon at least one opening (11) discharging the particles separated from the gas flow;
   wherein the cyclone tube (9) together with the immersion tube are both arranged on, is formed together with and formed by the second housing component (4) as a single one-piece monolithic second housing component wherein the second housing component (4) comprises a plurality of immersion tubes (10) and a corresponding plurality of cyclone tubes (9) into which the gas flow to be cleaned flows in through the guiding apparatus (7) provided formed with the first housing component (3), respectively; wherein a first section of each cyclone cell is integral with the first housing component (3) and a mating second section of each cyclone cell is integral with the second housing component (4); wherein when the first housing component is closed onto the second housing component, joining projections (17) couple first and second cyclone cell sections as one or more complete cyclone cells.

2. Cyclone separator according to claim 1, wherein the second housing component (4) is embodied as a monolithic unitary component.

3. Cyclone separator according to claim 1, wherein the at least one opening (11) of the cyclone tubes (9) face towards the discharge opening (13) discharging the particles.

4. Cyclone separator according to claim 1, wherein the first housing component (3) and the second housing component (4) are secured to each other by a releasable plug-in connection.

5. Cyclone separator according to claim 1, wherein the immersion tube (10) projects into the cyclone tube (9) on a side facing away from the first housing component (3).

6. Cyclone separator according to claim 1, wherein the at least one opening (11) discharging the particles is formed on an end of the cyclone tube (9) that faces away from the first housing component (3).

7. Cyclone separator according to claim 1, wherein the guiding apparatus (7) has a plurality of guiding vanes (8).

8. Cyclone separator according to claim 1, wherein the second housing component is embodied as a housing cup and the first housing component as a housing cover.

9. Cyclone separator according to claim 1, wherein on the first and/or on the second housing component (3, 4) a discharge opening (13) for discharging particles from the cyclone separator (1) is disposed.

10. Cyclone separator according to claim 1, wherein the first housing component or the second housing component has a discharge opening (13) for discharging particles removed from the incoming gas flow by the cyclone separator to an exterior of the cyclone separator housing.

11. Cyclone separator according to claim 1, wherein the second housing component (4) is embodied as a monolithic unitary plastic component that is in particular produced by an injection molding process.

12. Cyclone separator according to claim 11, wherein the second housing component (4) comprises a plurality of immersion tubes (10) and a corresponding plurality of cyclone tubes (9) into which the gas flow to be cleaned flows in through the guiding apparatus (7) provided on the first housing component (3), respectively;
   wherein the first housing component (3) and the second housing component (4) are secured to each other by a releasable plug-in connection;
   wherein the immersion tube (10) projects into the cyclone tube (9) on a side facing away from the first housing component (3);
   wherein the at least one opening (11) discharging the particles is formed on an end of the cyclone tube (9) that faces away from the first housing component (3);
   wherein the guiding apparatus (7) has a plurality of guiding vanes (8);
   wherein the second housing component is embodied as a housing cup and the first housing component as a housing cover;
   wherein on the first and/or on the second housing component (3,4) a discharge opening (13) for discharging particles from the cyclone separator (1) is disposed.

* * * * *